United States Patent [19]
Kitano

[11] Patent Number: 5,800,670
[45] Date of Patent: *Sep. 1, 1998

[54] SPREADER OF AN OPTICAL DISC

[75] Inventor: Ryoko Kitano, Tokushima-ken, Japan

[73] Assignee: Kitano Engineering Co., Ltd., Komatsushima, Japan

[*] Notice: The term of this patent shall not extend beyond the expiration date of Pat. No. 5,744,193.

[21] Appl. No.: 650,885

[22] Filed: May 17, 1996

[30] Foreign Application Priority Data

May 20, 1995 [JP] Japan ................... 145545/95

[51] Int. Cl.$^6$ .................................. B32B 31/00
[52] U.S. Cl. ................. 156/578; 156/74; 118/52; 427/240
[58] Field of Search ............... 156/74, 578; 118/52; 369/286; 427/240, 207.1; 264/311

[56] References Cited

U.S. PATENT DOCUMENTS

| | | | |
|---|---|---|---|
| 4,838,979 | 6/1989 | Nishida et al. | 118/52 X |
| 4,877,475 | 10/1989 | Uchida et al. | |
| 4,982,694 | 1/1991 | Moriyama | 118/52 X |
| 4,995,799 | 2/1991 | Hayashi et al. | 264/1.33 X |
| 5,069,155 | 12/1991 | Kunze-Concewitz et al. | 118/52 |
| 5,312,487 | 5/1994 | Akimoto et al. | 118/52 |

FOREIGN PATENT DOCUMENTS

| | | | |
|---|---|---|---|
| 4107811 | 4/1992 | Japan | 118/52 |
| 4-53012 | 8/1992 | Japan . | |
| 6132211 | 5/1994 | Japan | 118/52 |
| 836786 | 2/1996 | Japan . | |

*Primary Examiner*—Jeff H. Aftergut
*Attorney, Agent, or Firm*—Flynn, Thiel, Boutell & Tanis, P.C.

[57] ABSTRACT

A spreader of an optical disc capable of receiving an adhesive when first and second resin substrates are rotated at high speed in a spreading step in the case of manufacturing the optical disc, and capable of preventing the adhesive from being contaminated at the peripheries of the first and second resin substrates. The spreader of the optical disc for spreading the adhesive comprises the first resin substrate and second resin substrate, wherein the first and second resin substrates are laid on and bonded to each other by way of the adhesive and rotated together, a rotatable receiving platform on which the first resin substrate is placed, and a cover member for receiving the adhesive scattered from the first and second resin substrates when they are rotated. The spreader of the present invention can surely receive the adhesive interposed between the first and second resin substrates, which is scattered outward, and prevent the adhesive from being scattered therearound.

10 Claims, 5 Drawing Sheets

SPREADER OF AN OPTICAL DISC

BACKGROUND OF THE INVENTION

1. Field of the Invention

The present invention relates to a spreader of an optical disc, more particularly, to a spreader of an optical disc comprising first and second resin substrates, which are laid on each other by way of an adhesive and rotated together so as to spread the adhesive.

2. Prior Art

Computers have been now used in various fields, and they have a leap forward for development of capacity and speed thereof. Particularly, storage density is improved dramatically, leading to the impact on daily life to change a common sense in the daily life. A storage disc, particularly, an optical disc is convenient to be carried and has various uses as storage means.

The optical disc is preferably formed of a discoid substrate made of synthetic resin such as polycarbonate.

Signal pits that are information signals are stored in the resin substrate, and a reflecting film made of aluminum or the like is formed on the signal pits.

A protecting resin member made of, e.g., ultra violet curing resin (so called UV resin) is formed on the reflecting film for protecting the signal pits.

Whereupon, a thickness of the resin substrate is preferable to be as thin as possible in order to record information as the signals with high density. However in view of the manufacturing limitation and strength of the resin substrate, a thickness of the resin substrate is set to 0.6 mm.

Since a CD has a thickness of about 1.2 mm in its standard, if a thickness of a first resin substrate is conformed to that of the CD, a second resin substrate must be bonded to the first resin substrate.

FIG. 7 is a cross sectional view of an optical disc comprising two resin substrates which are bonded to each other wherein signal information is stored in one of the resin substrates.

An optical disc, which is illustrated simply in FIG. 7, comprises two resin substrates which are bonded to each other. An optical disc 1D comprises a first resin substrate 2D composed of a reflecting film 3D and a protecting resin member 4D respectively formed on signal pits, and a second resin substrate 6D wherein the first resin substrate 2D and second resin substrate 6D are bonded to each other by an adhesive 5D and the adhesive 5D is then cured.

The optical disc 1D comprising two resin substrates which are bonded to each other is sufficient in strength. That is, the optical disc 1D comprising two resin substrates 2D and 6D which are bonded to each other is strong in strength and meets a dominating CD standard, which is very advantageous in view of a general purpose.

Such an optical disc is manufactured by the inventors of the present invention by the following method.

First, an adhesive, e.g., UV curing resin is coated on a resin substrate (first resin substrate) in which signals are recorded. The coating in this case is performed by means of a coating roller, a discharge nozzle, etc. A second resin substrate is placed on the first resin substrate after the adhesive is coated on the first resin substrate.

The first and second resin substrates which are placed and laid on each other are rotated so that the adhesive is uniformly spread. The adhesive interposed between the first and second resin substrates is cured after it is spread. For example, the adhesive is irradiated by ultraviolet rays when it is cured in case the UV curing resin is used as the adhesive. The first and second resin substrates are surely integrated with each other when the adhesive is cured, thereby obtaining the optical disc which are strongly bonded to each other.

Whereupon, the inventors of the present invention spread an adhesive by rotating the first and second resin substrates at high speed in a spreading step when manufacturing the optical disc by bonding such first and second resin substrates. However, there occurs such a problem that the adhesive is scattered from the first and second resin substrates owing to the rotation of the first and second resin substrates at high speed when the adhesive is spread, thereby contaminating the periphery of the optical disc.

Particularly the adhesive is forcibly scattered at a stroke when it is accelerated from the start of rotation thereof.

The adhesive which is scattered outward contaminates the peripheries of the first and second resin substrates or it is scattered on a floor and remains thereon. The adhesive remaining on the floor is cured with the lapse of time and is fixed to the floor, which causes a serious problem.

SUMMARY OF THE INVENTION

The present invention solved the problems of the prior art spreader of an optical disc.

That is, it is an object of the present invention to provide a spreader of an optical disc capable of receiving an adhesive when first and second resin substrates are rotated at high speed in a spreading step in the case of manufacturing the optical disc, and capable of preventing the adhesive from being contaminated at the peripheries of the first and second resin substrates. To meet this object, the inventors of the prevent invention completed the present invention by providing members for preventing the adhesive from being scattered.

To achieve the above object, the spreader of an optical disc according to the first aspect of the invention comprises a first resin substrate and a second resin substrate, wherein the first and second resin substrates are laid on and bonded to each other by way of an adhesive and rotated together for spreading the adhesive, a rotatable receiving platform on which the first resin substrate is placed, and a cover member for receiving the adhesive which is scattered when the first and second resin substrates are rotated.

In the spreader of the optical disc according to the first aspect of the invention, the cover member is arranged to surround entire peripheries of the first and second resin substrates.

Likewise, in the same spreader, the receiving platform is movable up and down. In the same spreader, the cover member is movable up and down. In the same spreader, the cover member has a discharge port for discharging the adhesive which is received thereby. In the same spreader, the cover member comprises a dome member and a bottom plate for receiving the dome member and the dome member is detachable from the bottom plate.

In the immediately preceding spreader, the dome member comprises an upper cover portion and a side wall portion wherein the upper cover portion is detachable from the side wall position.

In the same spreader, the upper cover portion is inclined at a lower surface thereof. Also in the same spreader, the receiving platform has a boss at a central portion thereof, and the boss has a suction hole for sucking the adhesive. Still in the same spreader, the receiving platform has suction holes in a surface thereof for sucking and holding the resin substrates.

According to the present invention, when the optical disc, i.e., the first and second resin substrates are rotated, the adhesive which is scattered outward can be surely received by the cover member. The adhesive is prevented from being scattered by the provision of the cover member, so that a peripheral environment is not contaminated.

BRIEF DESCRIPTION OF THE DRAWINGS

FIG. 2 shows an external appearance of an upper cover portion, wherein

PREFERRED EMBODIMENT OF THE INVENTION

A preferred embodiment of the present invention will be described now with reference to FIGS. 1 through 6.

First of all, steps of manufacturing an optical disc will be described for explaining the positioning of the parts of a spreader. FIGS. 6(A) through 6(E) are schematic views showing steps of manufacturing the optical disc by bonding two resin substrates and they are arranged in the order of manufacturing steps.

Figure 6E:
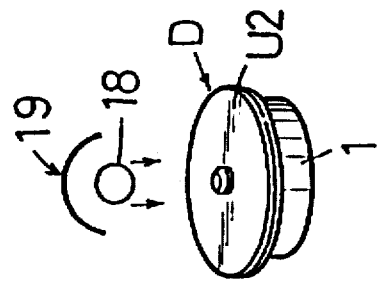
FIGS. 6(A) through 6(E) are schematic views showing steps for manufacturing an optical disc by bonding two resin substrates.
Figure 6D:
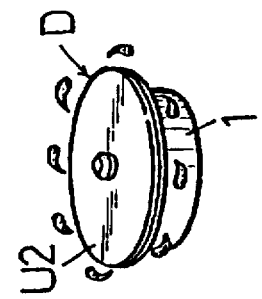
Figure 6C:
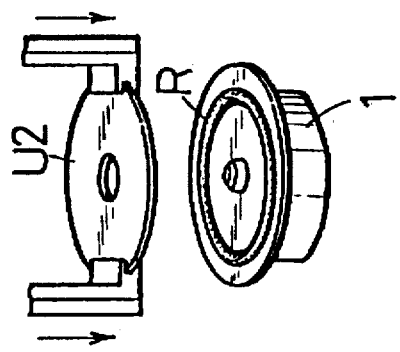
Figure 7:
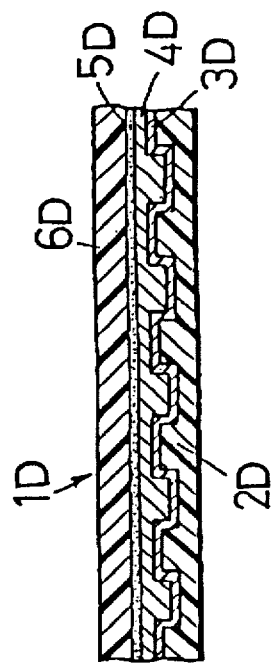
FIG. 7 shows a conventional optical disc prepared by bonding two resin substrates.
Figure 6B:
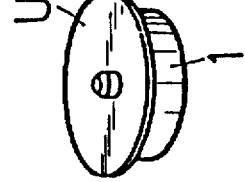
Figure 6A:
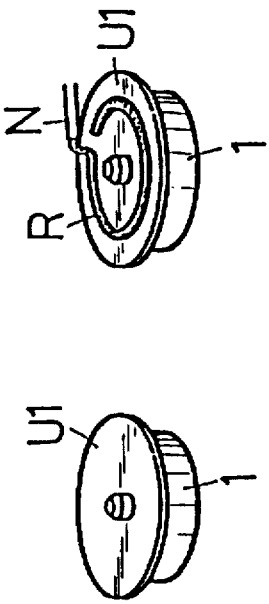

First, a first resin substrate U1 (first resin substrate) in which signals are recorded is placed on a receiving platform 1 (FIG. 6(A)). The receiving platform 1 has a boss at the center thereof for positioning the first resin substrate U1 and it is rotatable.

Thereafter, the first resin substrate U1 is placed on the receiving platform 1, then an adhesive, such as a UV curing resin is coated on the first resin substrate U1 (FIG. 6(B)). In the case that the UV curing resin is employed as the adhesive R, the coating is preferable to be performed in such a manner that the adhesive drops from a discharge nozzle N over the first resin substrate U1.

The adhesive R is coated on the first resin substrate in a doughnut shape from the discharge nozzle N in a state where the first resin substrate U1 is rotated. The coating in such a doughnut shape is very advantageous for preventing the adhesive from being mixed with the adhesive, but the detail of such coating is not essential to the present invention, and hence the explanation thereof is omitted.

A second resin substrate U2 is placed on the first resin substrate U1 after the adhesive R is coated on the first resin substrate U1 (FIG. 6(C)).

A manner of placing the second resin substrate U2 on the first resin substrate U1 is very important, which influences upon the quality of spreading in a succeeding step, which is however not essential to the present invention, and hence the detailed explanation thereof is also omitted.

If the receiving platform 1 is rotated after the second resin substrate U2 is placed on the first resin substrate U1, they are rotated at high speed (several rpm) while they are integrated with each other (FIG. 6(D)) so that the adhesive R interposed between the first resin substrate and second resin substrates is uniformly spread to be extended to the entire surface of the first resin substrate U1 and second resin substrate U2.

Further, air confined in the adhesive R between the first resin substrate U1 and second resin substrate U2 is blown off when the first resin substrate U1 and second resin substrate U2 are rotated.

In case that air is confined in the adhesive R per se even in small quantities, it is also possible to let the air contained in the adhesive R escape completely outside from the adhesive R when the first resin substrate U1 and second resin substrate U2 are rotated.

In this spreading step, a considerable quantity of adhesive R of the adhesive R interposed between the first and second resin substrates is scattered outward from the circumferential peripheries of the first resin substrate U1 and second resin substrate U2 when the first resin substrate U1 and second resin substrate U2 are rotated at high speed.

Although the spreading time is about several seconds, the adhesive R is scattered outward violently within 1 to 2 seconds that are required for the first resin substrate U1 and second resin substrate U2 to be accelerated to a high-speed rotation.

The spreader of the present invention is used in this spreading step, and the detailed explanation thereof is described later. After the adhesive R is spread, the adhesive R is cured (FIG. 6(E)).

In case that the adhesive R is the UV curing resin, the second resin substrate U2 is irradiated by the UV rays from the above thereof to be cured while the first resin substrate U1 and second resin substrate U2 are rotated at low speed. The UV rays are normally emitted by a UV irradiation source 18 having a reflecting mirror 19 at the rear thereof.

The UV curing resin is cured upon reception of the UV rays so that the first resin substrate U1 and second resin substrate U2 are surely integrated with each other, thereby obtaining the optical disc comprising the first resin substrate U1 and second resin substrate U2 which are strongly bonded to each other.

In case that the adhesive R is of a hot melt type, it is not irradiated by the UV rays but it may be naturally cured.

When taking the aforementioned steps, the two resin substrates are bonded to and integrated with each other so as to form the optical disc.

In the course of bonding two resin substrates, after the second resin substrate U2 is placed on the first resin substrate U1, the receiving platform 1 is rotated at high speed so that the first resin substrate U1 and second resin substrate U2 are integrated with each other and rotated at high speed to spread the adhesive R using the spreader employing a specific unique mechanism of the present invention.

The arrangement of the spreader will be described now hereinafter.

Figure 1:
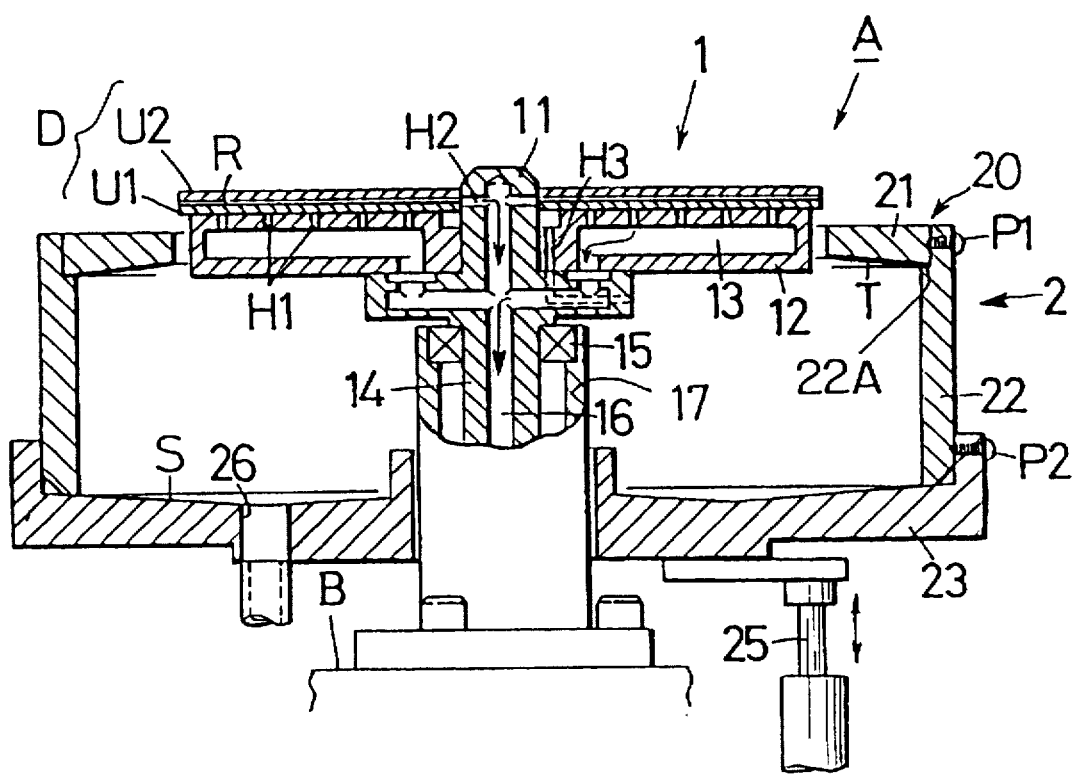
FIG. 1 is a view for explaining a spreader.
Figure 2A:
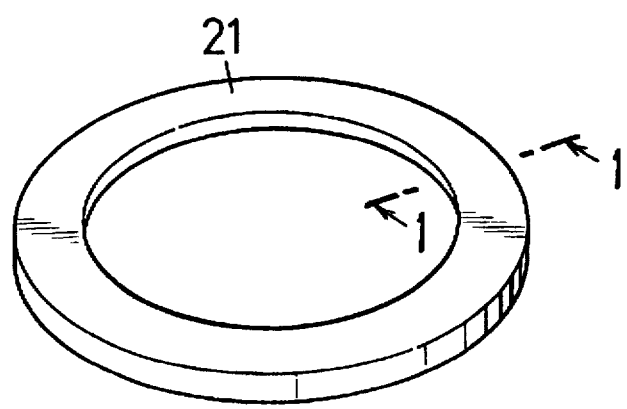
FIG. 2(A) is a perceptive view of the cover portion and FIGS. 2(B) through 2(D) are a cross sectional view taken along 1—1 of FIG. 2(A)
Figure 2B:
Figure 2C:
Figure 2D:

FIG. 1 shows the spreader comprising a receiving platform 1 and a cover member 2. The receiving platform 1 includes a discoid receiving plate 12 for directly receiving an optical disc D, a rotary shaft 14 provided on the receiving plate 12, and a supporting sleeve 17 for supporting the rotary shaft 14. The supporting sleeve 17 has a bearing 15 for surely supporting the rotary shaft 14 of the receiving plate 12.

The supporting sleeve 17 is provided on a base B for supporting the entire receiving platform 1 in a stable condition.

The receiving plate 12 has a suction hole H1 defined on the surface and a recess 13 defined inside, and the recess 13 communicates with a passage 16 provided at the center of the rotary shaft 14. The passage 16 of the rotary shaft 14 is opened to a suction source, not shown, which controls a suction operation.

The optical disc D placed on the receiving plate 12 is sucked by air under negative pressure generated by suction source which air passes subsequently through suction holes H1, the recess 13 and the passage 16, and it is surely held by the receiving plate 12.

A boss 11 is provided on the central portion of the receiving plate 12 wherein it ensures the positioning of the optical disc D when it is engaged in a central hole of the optical disc D in case that the optical disc D is placed on the receiving plate 12. A suction hole H2 is defined in the boss 11 to ensure the suction by the suction source in such a manner that the adhesive R interposed between the first resin substrate U1 and second resin substrate U2 is sufficiently extended even at the center thereof. The air under negative pressure generated by the suction source passes successively through the suction hole H2 and the passage 16 of the rotary shaft 14, thereby sucking the adhesive. A suction hole H3 is provided for inducing and introducing the atmosphere at that time. It is needless to say that although the suction hole H1 of the receiving plate 12 and the suction hole H2 of the boss 11 communicate with the same suction source but they can communicate with different suction sources while suction passages thereof are separately provided. These are subject matters for a different application, and hence the detailed explanation thereof is omitted.

The cover member 2 is disposed around the receiving platform 1. The cover member 2 prevents the adhesive R from being scattered and it comprises a dome body 20 and a bottom platform 23 wherein the dome body 20 is separated into a side wall portion 22 and an upper cover portion 21.

Figure 3:
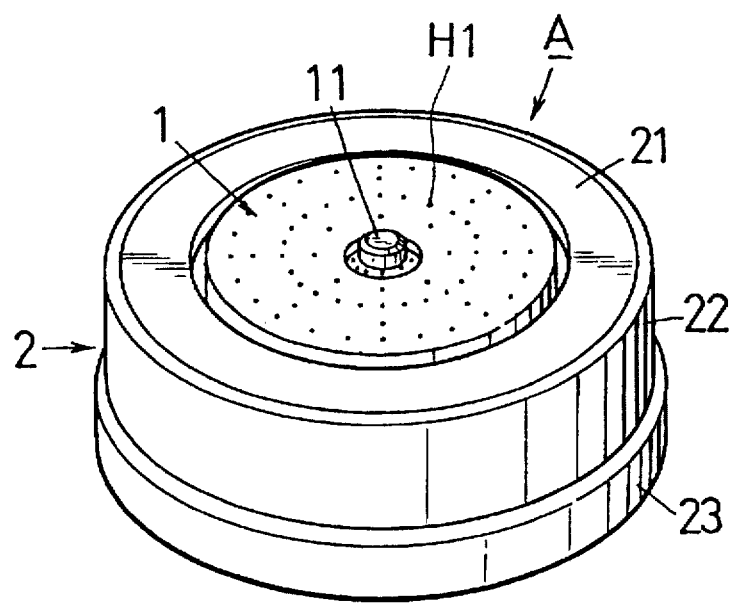
FIG. 3 shows an external appearance of the spreader.

As is understood from FIGS. 1 and 3, the side wall portion 22 of the dome body 20 is cylindrical, and the upper cover portion 21 has a shape of doughnut.

The dome body 20 is assembled in such a manner that the upper cover portion 21 is engaged with an upper groove 22A of the side wall portion 22. It is preferable to use a screw P1, etc., for fixing the upper cover portion 21 to the side wall portion 22 to ensure the connection therebetween.

The bottom platform 23 receives the dome body 20, and also receives the adhesive which drops through the inner wall side of the side wall portion 22 after the adhesive is scattered from the optical disc D, described later, and then discharges the adhesive outside.

Accordingly, a discharge port 26 is defined in the bottom platform 23, and an inclination S is formed on the bottom surface of the bottom platform 23 so that the adhesive which drops through the side wall portion 22 can flow easily toward the discharge port 26.

A cylinder rod 25 is fixed to the lower surface of the bottom platform 23 so that the entire cover member including the bottom platform 23 is vertically movable by the movement of the cylinder rod 25.

Whereupon, the dome body 20 and the bottom stand 23 are engaged with each other in such a manner that the outer periphery of the dome body 20 contacts the inner periphery of the standing portion of the bottom platform 23. Then, if the dome body 20 is pressed by a pin P2, the dome body 20 and the bottom platform 23 can be fixed more stably.

As mentioned above, in the spreader of the present invention, the adhesive R, which is scattered around the receiving platform 1 when the receiving platform 1 is rotated, can be accurately received by the cover member 2 which is disposed around the receiving platform 1.

Further, since the cover member 2 is movable vertically with respect to the receiving platform 1, it can be disposed at a position where the adhesive R is prevented from being scattered only when needed.

Described next is a manner that the adhesive R made of the UV curing resin, etc., is spread.

FIG. 4 shows a spreading step by use of the spreader.

First, the first resin substrate U1 is placed on the receiving platform 1, then the adhesive such as the UV curing resin is coated on the first resin substrate U1, successively, the second resin substrate U2 is placed on the first resin substrate U1 (Steps A and B).

At this time, the cover member 2 lowers at its upper end to a position which is substantially the same as the central position of the receiving platform 1, and stands by at the same position (Step B).

From the state in Step B, the cover member 2 starts to rise and stops at a position which is slightly over the upper surface of the optical disc D of the receiving platform 1.

When the receiving platform 1 is rotated at high speed for about several seconds, the adhesive R interposed between two resin substrates is spread and extends uniformly on the entire surface of the optical disc D. In this case, the adhesive R is scattered substantially horizontally outward from the end surface of the rotating optical disc D owing to the centrifugal force (Step D).

Since the adhesive R is liquid having flowability, it is scattered while it is slightly dispersed vertically after it is blown off.

The scattered adhesive R strikes against the side wall portion 22 of the dome body 20 of the cover member 2 and drops along the inner wall of the side wall portion 22. The dropped adhesive R passes through the inclination S and is appropriately discharged through the discharge port 26. Since the discharge port 26 communicates with the suction source, not shown, the discharge of the adhesive R can be speeded up.

It is preferable that the scattered adhesive R is directly received at the lower surface T of the upper cover portion 21.

When the adhesive R is once received at the lower surface of the upper cover portion 21, the traveling force of the adhesive R is softened, and it travels along the inner wall of the side wall portion 22, then drops, whereby the adhesive R is prevented from being splashed.

Whereupon, the position where the adhesive R is directly received can be changed by adjusting the vertical movement of the cover member 2. Meanwhile, the adhesive R is unsteadily dispersed slightly vertically as mentioned above when it is scattered horizontally outward owing to the high speed rotation. Accordingly, the adhesive R, which is scattered while it is dispersed slightly vertically, is prevented from being splashed upward by the upper cover portion 21.

The adhesive R, which is scattered toward and stuck to the lower surface T of the upper cover portion 21, flows along the lower surface T since the lower surface T is inclined, and it also flows along the inner wall of the side wall portion 22, then it drops on the bottom platform 23. The degree of inclination of the lower surface T is shown, e.g., in FIGS. 2(B) through 2(D), wherein a gentle inclination is T1 denoted by FIG. 2(B), a middle inclination is T2 denoted by FIG. 2(C) and a sharp inclination is T3 denoted by FIG. 2(D). It is possible to freely change the degree of inclination of the upper cover portion 21 by selectively employing, e.g., one of the inclinations shown in FIGS. 2(B) through 2(D). This is caused by the fact that since a scattering manner of the adhesive R is differentiated depending on the rpm of the receiving platform 1, the kinds of adhesives, e.g., viscosity of the UV curing resin, etc., the upper cover portion 21 must be selected to be adapted for such differentiation.

Figure 5:
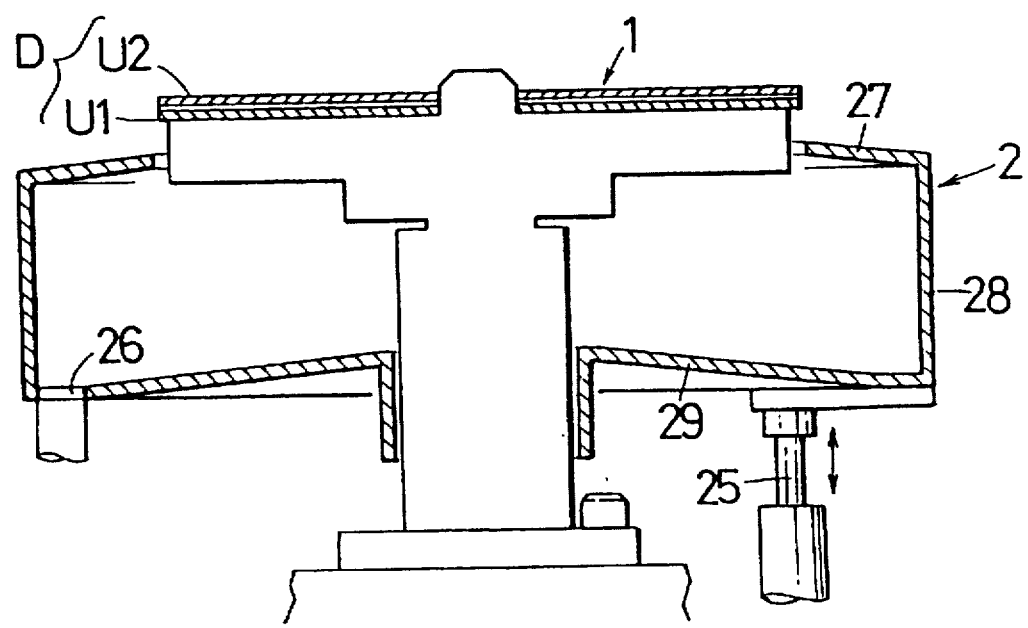
FIG. 5 is schematic view showing a spreader having a modified cover member.
Figure 4A:
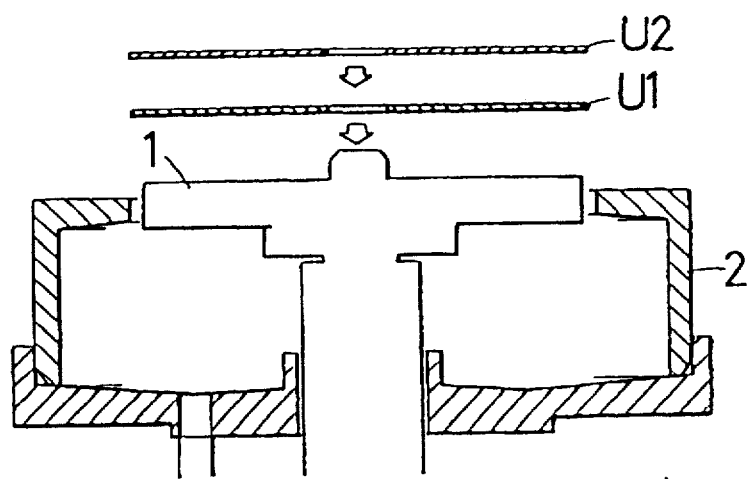
FIGS. 4(A) through 4(D) are views showing steps for spreading an adhesive.
Figure 4B:
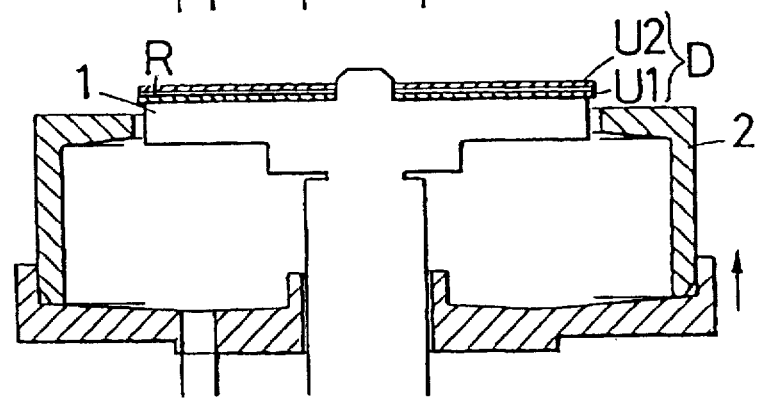
Figure 4C:
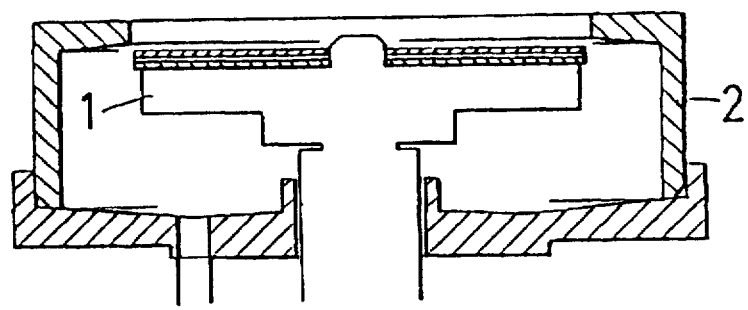
Figure 4D:
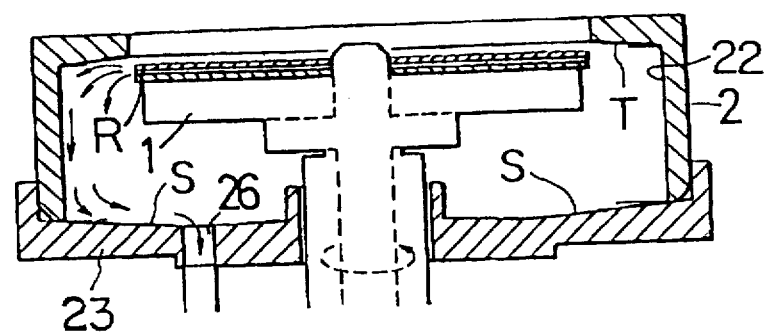

FIG. 5 shows a modified example of the cover member 2 of the spreader.

The cover member 2 is integrally formed as a whole, namely, it corresponds to the dome body 20 in FIG. 1, but it comprises a piece of uniform plate-shaped body, namely, the upper cover portion 21, the side wall portion 22 and the bottom platform 23 in FIG. 1 is integrated with one another to form a piece of body. A bent portion 27 is slightly inclined and has substantially the same function as the upper cover portion 21 of the dome body 20 in FIG. 1.

The scattered adhesive R is received by a standing wall 28 and drops along the inner wall of the standing wall 28. A bottom plate 29 is inclined outward, and hence the adhesive R is collected at the inclined portion of the bottom plate 29. Thereafter the adhesive R is discharged from the discharge port 26. This modified cover member 2 is also movable vertically by the cylinder rod 25.

The present invention is not limited to the preferred embodiment and its modified example but it can be modified variously to an extent not to deviate the essence of the present invention.

For example, the shape of the dome body and that of the bottom platform can be changed to such an extent to achieve their functions. It is needless to say that the receiving platform can be moved vertically instead of the vertical movement of the cover member. In this case, namely, the vertical movement of the receiving plate can be performed, e.g., by moving the supporting sleeve 17 and the rotary shaft 14 using a hydraulic apparatus. The adhesive can be employed irrespective of the kinds thereof if it can bond the first and second resin substrates.

With the arrangement of the present invention, the spreader of the present invention can surely receive the adhesive interposed between the first and second resin substrates, which is scattered outward, and prevent the adhesive from being scattered therearound. Further, the vertical scattering of the adhesive can be completely prevented due to the unique structure of the cover member.

What is claimed is:

1. A platform arrangement for supporting an optical disc having first and second resin substrates each with a central hole therethrough and having uncured adhesive in a space between the first and second resin substrates, comprising:

a receiving platform having a support surface thereon adapted to support the first resin substrate thereon;

a boss having a hollow interior mounted on said table so as to be oriented in the central hole of the first resin substrate, the boss having suction openings oriented around a periphery of the boss adjacent a radially inner edge of the space and connected to the hollow interior of the boss;

a cover member having an upstanding sidewall and a bottom wall contiguous therewith, thereby forming an excess adhesive receiver, the sidewall being oriented in a position radially outwardly spaced from a radially outer periphery of the optical disc;

rotation means for simultaneously rotating the first and second resin substrates to effect a radially outward spread of the uncured adhesive in the space between the first and second resin substrates, excess adhesive being flung radially outwardly away from the first and second resin substrates and collected in the cover member; and suction means for effecting through the hollow interior of the boss and the suction openings a pressure reduction at the radially inner edge of the space between the first and second resin substrates and a radially inward spread of the uncured adhesive.

2. The platform arrangement according to claim 1, wherein said receiving platform includes support means for supporting said receiving platform for movement between first and second positions.

3. The platform arrangement according to claim 2, wherein the cover member includes a drive means for reciprocating the cover member between a third position wherein the sidewall is oriented in a position radially outwardly spaced from the radially outer periphery of the optical disc and a fourth position wherein the sidewall is oriented offset from a theoretical plane containing the optical disc.

4. The platform arrangement according to claim 1, wherein said cover member has a discharge port for discharging the adhesive received thereby.

5. The platform arrangement according to claim 1, wherein said cover member comprises a dome member with said sidewall thereon and a bottom plate with said bottom wall thereon for receiving the said dome member, and wherein said dome member is detachable from said bottom plate.

6. The platform arrangement according to claim 5, wherein said dome member additionally comprises an upper cover portion, and wherein said upper cover portion is detachable from said sidewall.

7. The platform arrangement according to claim 6, wherein said upper cover portion has an inclined surface facing said bottom wall.

8. The platform arrangement according to claim 1, wherein said receiving platform has suction holes in the support surface thereof for sucking and holding said first and second resin substrates thereto.

9. The platform arrangement according to claim 8, wherein the suction holes in the surface of the receiving platform for sucking and holding the first and the second resin substrates and the suction openings in the boss for sucking the adhesive between the first and the second resin substrates communicate through common passageways with the suction means.

10. The platform arrangement according to claim 1, wherein the cover member includes a drive means for reciprocating the cover member between a first position wherein the sidewall is oriented in a position radially outwardly spaced from the radially outer periphery of the optical disc and a second position wherein the sidewall is oriented offset from a theoretical plane containing the optical disc.

* * * * *